United States Patent
Zhang et al.

(10) Patent No.: US 6,880,842 B2
(45) Date of Patent: Apr. 19, 2005

(54) SINGLE-PIECE STEERING GEAR BRACKET AND STEERING GEAR JOINT MEMBER

(75) Inventors: Ouqi Zhang, Downingtown, PA (US); Jason A. Poirier, Sinking Spring, PA (US)

(73) Assignee: Torque-Traction Technologies, Inc., Maumee, OH (US)

( * ) Notice: Subject to any disclaimer, the term of this patent is extended or adjusted under 35 U.S.C. 154(b) by 142 days.

(21) Appl. No.: 10/325,743

(22) Filed: Dec. 23, 2002

(65) Prior Publication Data

US 2004/0201194 A1 Oct. 14, 2004

(51) Int. Cl.⁷ ............................................. B62D 7/00
(52) U.S. Cl. ............................................. 280/93.515
(58) Field of Search ................... 280/93.51, 93.511, 280/93.514, 93.515, FOR 107, FOR 108; 403/395, 400; 74/29, 30, 498

(56) References Cited

U.S. PATENT DOCUMENTS

| 3,864,989 A | 2/1975 | Jones |
| 3,869,139 A | 3/1975 | Gage |
| 3,958,462 A | 5/1976 | Matschinsky et al. |
| 4,314,710 A | 2/1982 | Kamoshita et al. |
| 4,465,292 A | 8/1984 | Fry et al. |
| 4,531,426 A | 7/1985 | Iijima |
| 4,580,462 A | 4/1986 | Rehlander |
| 6,102,416 A | 8/2000 | Harkrader et al. |
| 6,164,405 A | 12/2000 | Sakata |
| 6,189,902 B1 | 2/2001 | Lenzen, Jr. et al. |
| 2002/0024191 A1 | 2/2002 | Lee |

FOREIGN PATENT DOCUMENTS

| EP | 0 756981 A1 | 2/1997 | |
| EP | 0 764 571 A1 | 3/1997 | |
| FR | 2653730 | * 5/1991 | .................. 74/498 |
| JP | 2306882 | 12/1990 | |
| JP | 9254824 | 9/1997 | |
| JP | 10278812 | 10/1998 | |
| JP | 10324271 | 12/1998 | |
| JP | 2002-037092 | 2/2002 | |

* cited by examiner

Primary Examiner—Eric Culbreth
(74) Attorney, Agent, or Firm—Liniak, Berenato & White

(57) ABSTRACT

A mounting system for coupling attaching mounting a steering gear housing member to a vehicle frame, comprises at least one single-piece steering gear bracket secured to a cross member of the vehicle frame, and at least one corresponding single-piece steering gear joint member integral with the steering gear housing member and secured to the steering gear bracket.

13 Claims, 4 Drawing Sheets

SINGLE-PIECE STEERING GEAR BRACKET AND STEERING GEAR JOINT MEMBER

BACKGROUND OF THE INVENTION

1. Field of the Invention

The present invention relates to mounting systems for coupling a steering gear housing assembly to a motor vehicle and, more particularly, to a mounting system for coupling the steering gear housing assembly to a motor vehicle chassis, including a single-piece steering gear bracket and a single-piece steering gear joint member secured to the steering gear bracket.

2. Description of the Prior Art

Conventionally, as generally illustrated in FIG. 1, a steering gear assembly 110 of a motor vehicle is commonly mounted to a cross member 2 of a vehicle chassis frame. The steering gear assembly 110 includes a steering gear housing assembly 112 and a steering mechanism (not shown) for selectively actuating a pair of opposite tie rods 113 operatively connected to steering wheels (not shown) of the motor vehicle. The steering gear housing assembly 112 further includes a generally tubular steering housing member 114 extending substantially parallel to the cross-member 2 and housing a steering mechanism, such as hydraulic actuator, and a pair of steering gear joint members 116 attached to the steering housing member 114 through corresponding spaced apart leg members 118. Currently, the steering gear housing assembly 112 is mounted to the front cross member 2 of the vehicle chassis frame through multi-piece steering gear brackets 130.

As illustrated in detail in FIG. 2, the multi-piece steering gear bracket 130 comprises a top bracket part 132, a bottom bracket part 140 and a bush part 148. The top bracket part 132 includes a horizontal flange 134 and a pair of spaced apart, vertical flanges 136 and 138 all extending from a support plate 133. The support plate 133 of the steering gear bracket 130 is welded to the cross-member 2 of a vehicle chassis frame. The horizontal flange 134 has a mounting hole 135, while the vertical flanges 136 and 138 are provided with mounting holes 137 and 139 respectively. The bottom bracket part 140 of the multi-piece steering gear bracket 130 is mounted within the top bracket part 132 and includes a horizontal flange 142 and a pair of spaced apart, vertical flanges 144 and 146 all extending from a back plate 141. The horizontal flange 142 has a mounting hole 143, while the vertical flanges 144 and 146 are provided with mounting holes 145 and 147 respectively. The bush part 148 is substantially cylindrical in shape and is provided with a bore 149 therethrough. As further illustrated in FIG. 2, the steering gear joint 116 has a substantially cylindrical body 122 having an upper end portion 122a and a lower end portion 122b, and provided with an axial bore 123 therethrough. The leg member 118 is formed integrally with the body 122 of the steering gear joint 116.

In an assembled condition, the upper end portion 122a of the body 122 of the steering gear joint 116 is secured to the horizontal flange 134 of the top bracket part 132 of the multi-piece steering gear bracket 130 with a threaded fastener 150 (shown in FIG. 1) extending through the mounting hole 135 and the axial bore 123 in the top bracket part 132 and the steering gear joint 116 respectively, while the lower end portion 122b of the body 122 of the steering gear joint 116 is secured to the horizontal flange 142 of the bottom bracket part 140 of the multi-piece steering gear bracket 130 with the same threaded fastener 150 extending through the mounting hole 143 and the axial bore 123 in the bottom bracket part 140 and the steering gear joint 116 respectively. The bottom bracket part 140 is secured within the top bracket part 132 through the bush part 148 disposed within the bottom bracket part 140, and a threaded fastener (not shown) extended through the bore 149 in the bush part 148 and the mounting holes 137 and 139 in the top bracket part 132 and the mounting holes 145 and 147 in the bottom bracket part 140, respectively.

The conventional multi-piece steering gear brackets 130 and steering gear joints 116 are complex, cumbersome, costly in manufacturing and laborious in assembly.

Accordingly, it is the intent of this invention to overcome these shortcomings of the prior art.

SUMMARY OF THE INVENTION

The present invention provides an improved mounting system for coupling the steering gear housing assembly to a motor vehicle chassis.

The mounting system in accordance with the preferred embodiment of the present invention comprises at least one single-piece, unitary steering gear bracket secured to a cross member of a vehicle frame, and at least one complementary single-piece steering gear joint member integral with the steering housing assembly and secured to the steering gear bracket.

The steering gear housing assembly includes a hollow steering housing member extending substantially parallel to the cross-member and at least one steering gear joint member attached to the steering housing member through corresponding spaced apart leg member. Preferably, the steering gear housing assembly is formed integrally as a homogenous one-piece unitary part by a metal casting process. Alternatively, the steering gear joint members and corresponding leg member may be formed as a homogenous one-piece unitary part, then welded to the steering gear housing member to form the integral one-piece steering gear housing assembly. Preferably, the steering gear housing assembly is supported to the cross-member of the vehicle frame through a pair of the single-piece, unitary steering gear brackets.

The unitary steering gear bracket comprises a substantially horizontally extending flange and a pair of spaced apart, substantially vertically extending flanges forming a substantially U-shaped configuration. The steering gear bracket is further provided with a continuous mounting flange adapted for welding the steering gear bracket to the cross-member of a vehicle chassis frame. Each of the horizontally extending flange and the vertically extending flanges is provided with a mounting hole.

The steering gear joint member of the steering gear housing assembly in accordance with the preferred embodiment of the present invention has a hollow body including an upper end portion and a pair of opposite boss portions. Each of the upper end portion and the opposite boss portions is provided with a mounting hole adapted for fastening the steering gear joint member of the steering gear housing assembly to the steering gear bracket using a set of threaded fasteners extending through the corresponding mounting holes in the unitary, single-piece steering gear bracket and the steering gear joint member, thus securing the steering gear housing assembly to the cross-member of a vehicle chassis frame.

Therefore, the mounting system in accordance with the present invention is a novel arrangement of the mounting system for coupling the steering gear housing assembly to the vehicle chassis having the single-piece, unitary steering gear bracket secured to the vehicle chassis, and the single-piece steering gear joint member integrally formed with the steering gear housing and secured to the steering gear bracket provides a number of advantages over the current design, such as simplicity (requires less parts), inexpensive in manufacturing, ease of assembly/disassembly and servicing of the axle assembly, relatively low stress gradient and maximum stress.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
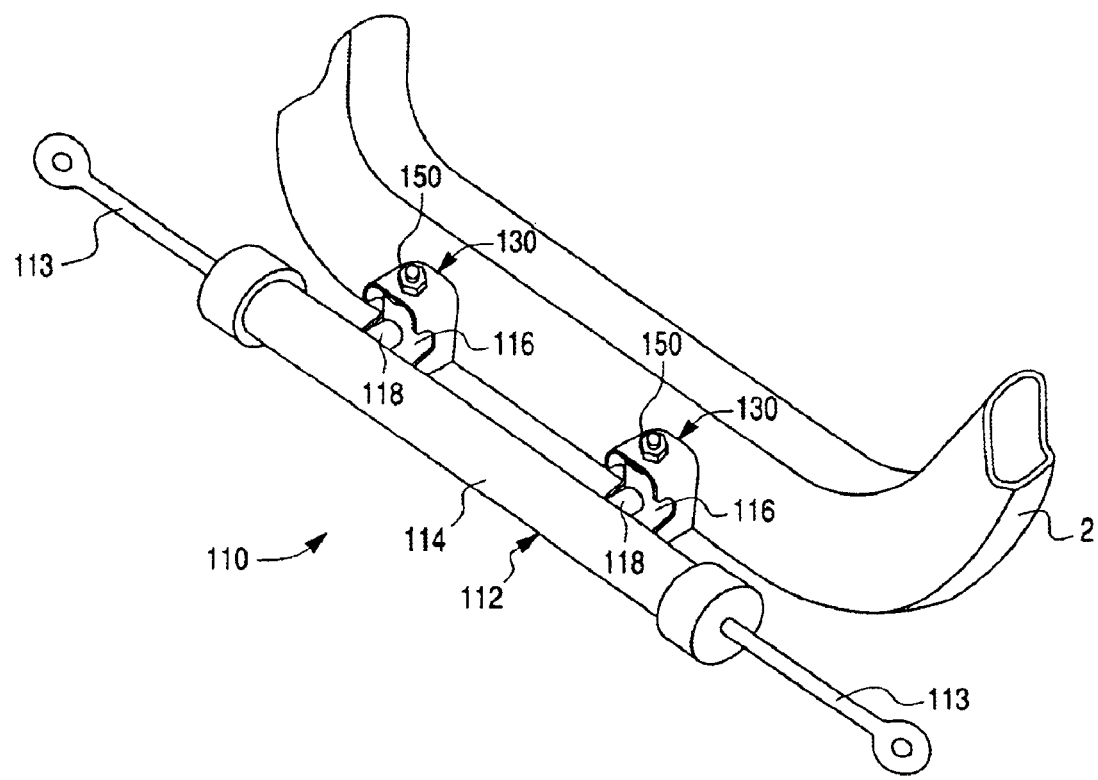
FIG. 1 is a partial perspective view of a conventional steering gear assembly of a motor vehicle mounted to a front cross member of a vehicle chassis frame of the prior art.
Figure 2:
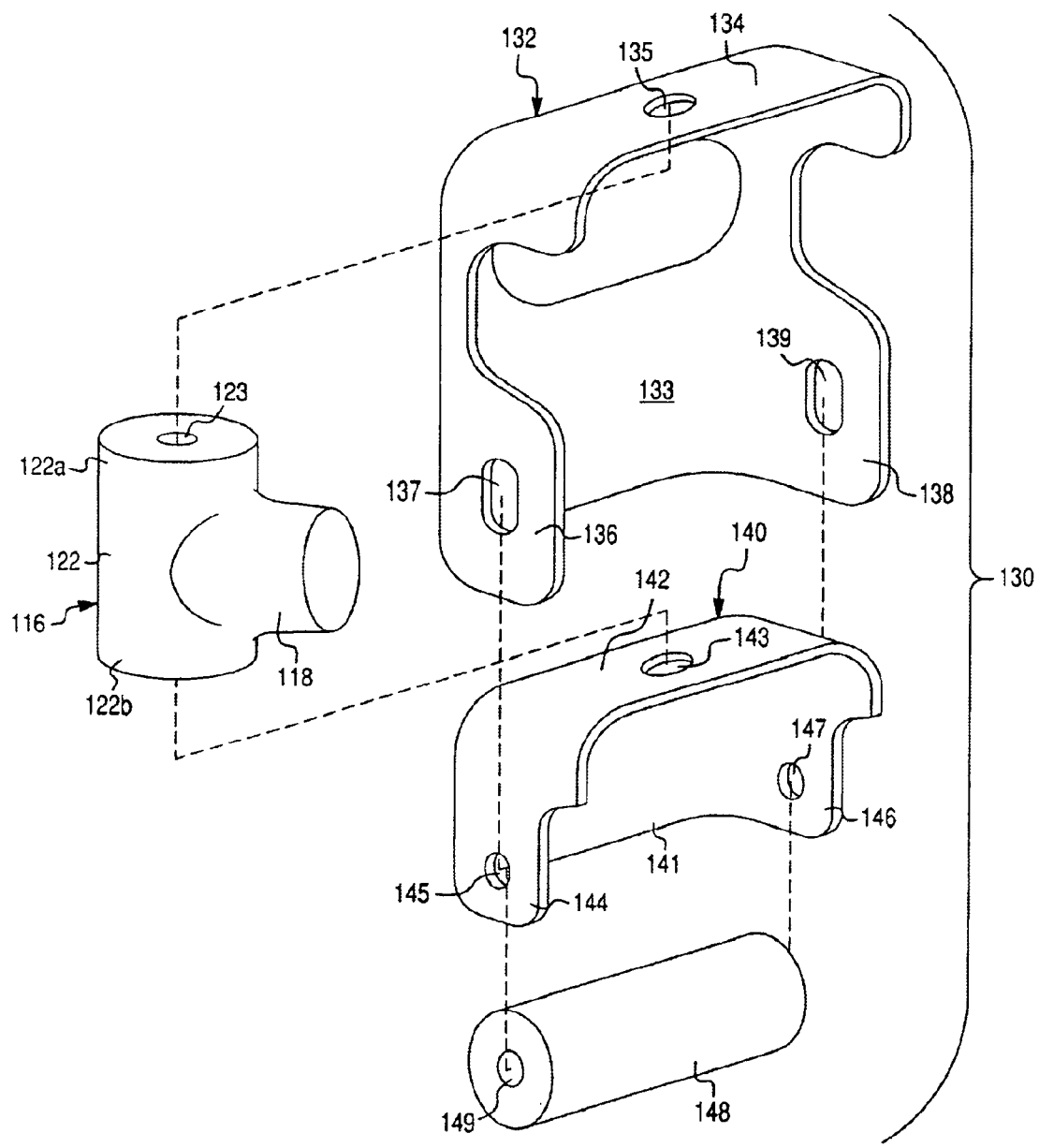
FIG. 2 is an exploded perspective view of a multi-piece steering gear bracket and a steering gear joint member of the prior art.
Figure 3:
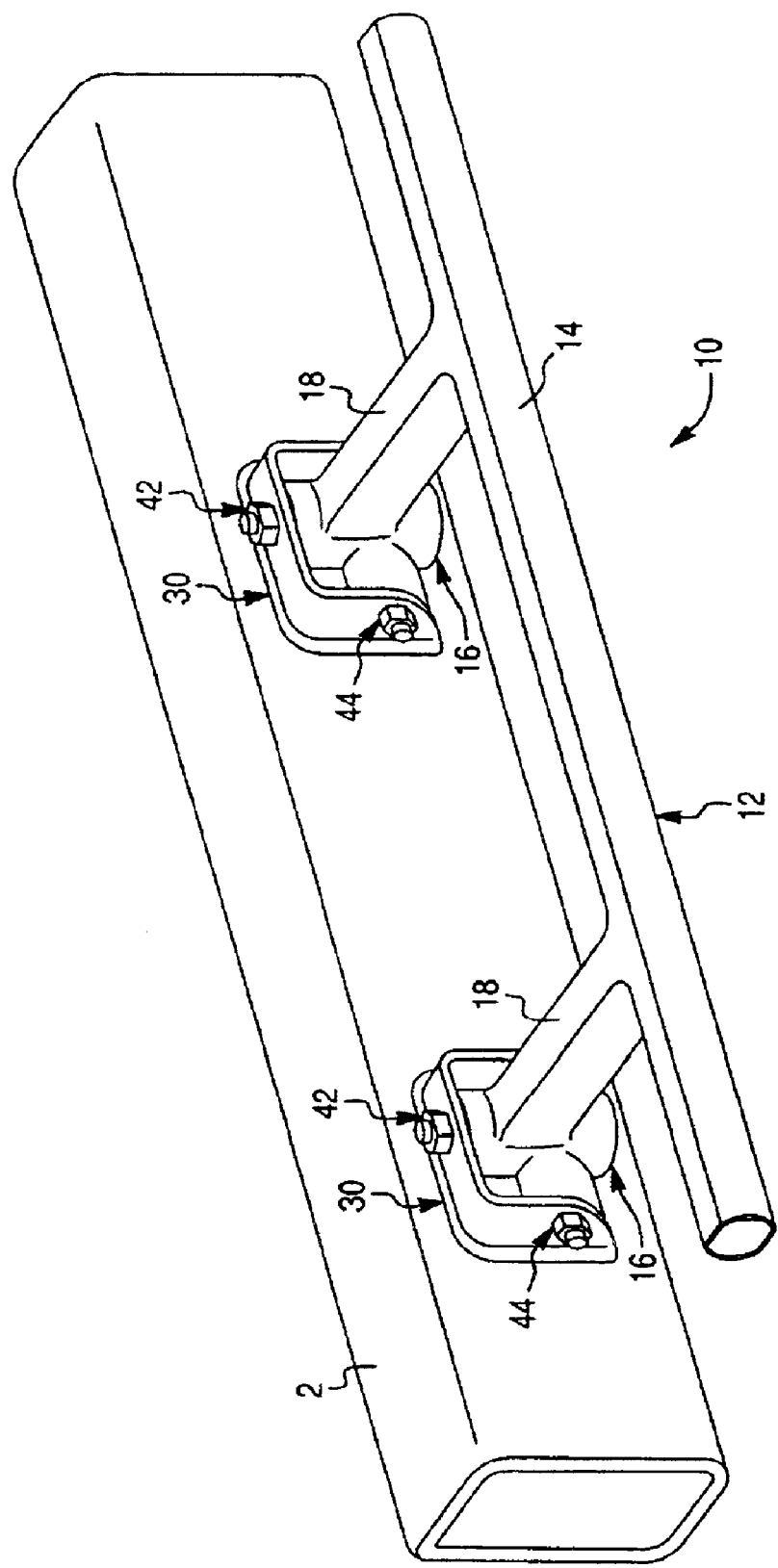
FIG. 3 is a partial perspective view of a steering gear assembly mounted to a front cross member of a vehicle chassis frame in accordance with the preferred embodiment of the present invention.

FIG. 3 depicts a steering gear assembly 10 in accordance with the preferred embodiment of the present invention. The steering gear assembly 10 is adapted to be secured to an appropriate portion of a vehicle body. Preferably, the steering gear assembly 10 is attached to a cross-member 2 of a vehicle frame. The cross-member 2 is generally perpendicular to a longitudinal axis of the vehicle. The steering gear assembly 10 comprises a steering gear housing assembly 12 supported to the cross-member 2 of the vehicle frame through at least one single-piece, unitary steering gear bracket 30. Preferably, as illustrated in FIG. 3, the steering gear housing assembly 12 is supported to the cross-member 2 of the vehicle frame through a pair of the single-piece, unitary steering gear brackets 30.

The steering gear housing assembly 12 includes a hollow steering gear housing member 14 extending substantially parallel to the cross-member 2 and a pair of steering gear joint members 16 attached to the steering gear housing member 14 through corresponding spaced apart leg members 18. Preferably, the steering gear housing assembly 12 is formed integrally as a homogenous one-piece unitary part by a metal casting process. Alternatively, the steering gear joint members 16 and corresponding leg members 18 may be formed as a homogenous one-piece unitary part, then welded to the steering gear housing member 14 to form the integral one-piece steering gear housing assembly 12. It will be appreciated by those skilled in the art that any other appropriate method of forming the integral one-piece steering gear housing assembly 12 is within the scope of the present invention.

Figure 4:
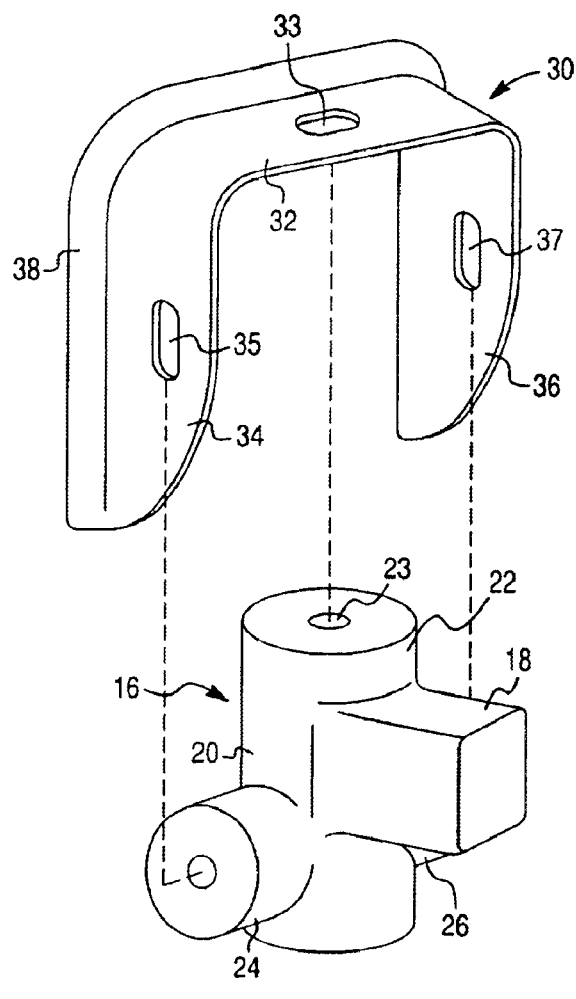
FIG. 4 is an exploded perspective view of a single-piece steering gear bracket and a single-piece steering gear joint member in accordance with the preferred embodiment of the present invention.

Preferably, the single-piece steering gear brackets 30 of the present invention are substantially identical. As illustrated in detail in FIG. 4, each of the unitary steering gear brackets 30 has a substantially U-shaped configuration and comprises a substantially horizontally extending flange 32 and a pair of spaced apart, substantially vertically extending flanges 34 and 36 forming a substantially U-shaped configuration. The steering gear bracket 30 is further provided with a continuous mounting flange 38 adapted for welding the steering gear bracket 30 to the cross-member 2 of a vehicle chassis frame. Moreover, the horizontally extending flange 32 has a mounting hole 33, while the vertically extending flanges 34 and 36 are provided with mounting holes 35 and 37 respectively. Preferably, each of the holes 35 and 37 is elongated in a vertical direction, as shown in FIG. 4. The holes 33, 35 and 37 in the steering gear brackets 30 are adapted for fastening the steering gear joint members 16 of the steering gear housing assembly 12 to the steering gear brackets 30, thus securing the steering gear housing assembly 12 to the cross-member 2 of a vehicle chassis frame.

Figure 5:
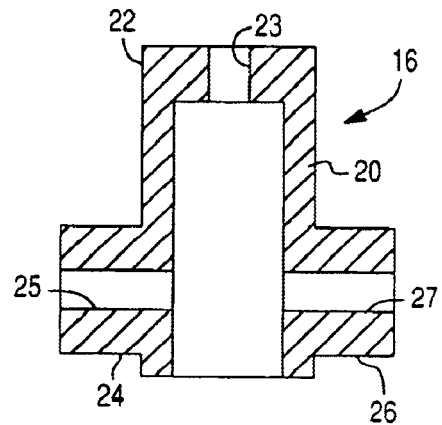
FIG. 5 is a cross-sectional view of the single-piece steering gear joint member in accordance with the preferred embodiment of the present invention.

FIGS. 4 and 5 illustrate the steering gear joint members 16 of the steering gear housing assembly 12 in accordance with the preferred embodiment of the present invention. Preferably, the steering gear joint members 16 are substantially identical. Each of the steering gear joint members 16 has a hollow body 20 including an upper end portion 22 and a pair of opposite boss portions 24 and 26. The upper end portion 22 has a mounting hole 23, while the pair of opposite boss portions 24 and 26 are provided with mounting holes 25 and 27 respectively.

As illustrated in FIG. 3, in an assembled condition, the upper end portion 22 of the steering gear joint member 16 is secured to the horizontally extending flange 32 of the unitary steering gear bracket 30 with a threaded fastener 42 extending through the mounting holes 23 and 33 in the steering gear joint member 16 and the steering gear bracket 30 respectively, while the opposite boss portions 24 and 26 of the steering gear joint member 16 are secured to the vertically extending flanges 34 and 36 of the steering gear bracket 30 with threaded fasteners 44 extending through the mounting holes 25–35 and 27–37 respectively in the steering gear joint member 16 and the steering gear bracket 30.

Therefore, the mounting system in accordance with the present invention includes a novel arrangement of the mounting system for coupling the steering gear housing assembly to the vehicle chassis having at least one single-piece steering gear bracket secured to the vehicle chassis, and at least one single-piece steering joint member integrally formed with the steering gear housing and secured to the steering gear bracket that provides a number of advantages over the current design, such as simplicity (requires less parts), ease of manufacturing and reduced manufacturing cost due to the use of less parts, ease of assembly/disassembly and servicing of the axle assembly, relatively low stress gradient and maximum stress, etc.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A mounting system for attaching a steering gear housing member to a vehicle body, said mounting system comprising:
    at least one single-piece, unitary steering gear bracket secured to said vehicle body; and
    at least one single-piece steering gear joint member integral with said steering gear housing member, said at least one steering gear joint member secured to said at least one steering gear bracket,
    wherein said at least one single-piece steering gear bracket has a horizontally extending flange and a pair of spaced apart vertically extending flanges,
    wherein said at least one single-piece steering gear joint member has an upper end portion secured to said horizontally extending flange of said steering gear bracket and a pair of opposite side boss portions extending between said pair of spaced apart vertically extending flanges of said steering gear bracket and secured thereto.

2. The mounting system as defined in claim 1, wherein said at least one steering gear joint member is fastened to said at least one steering gear bracket with threaded fasteners.

3. The mounting system as defined in claim 1, wherein said at least one steering gear bracket is secured to said vehicle body by welding.

4. The mounting system as defined in claim 1, wherein said vehicle body includes a frame having a cross-member, said at least one unitary steering gear bracket is secured to said cross-member of said frame.

5. The mounting system as defined in claim 4, wherein said at least one steering gear bracket is secured to said cross-member of said frame by welding.

6. The mounting system as defined in claim 1, wherein said at least one steering gear joint member is formed integrally with said steering gear housing member as a one-piece part.

7. The mounting system as defined in claim 6, wherein said at least one steering gear joint member is formed integrally with said steering gear housing member as a one-piece metal casting.

8. The mounting system as defined in claim 1, further including at least one leg member extending between said steering gear housing member and said at least one steering gear joint member, said at least one leg member being integral with said steering gear housing member and said at least one steering gear joint member.

9. The mounting system as defined in claim 8, wherein said at least one steering gear joint member and said at least one leg member are formed integrally as a homogenous one-piece unitary part.

10. The mounting system as defined in claim 9, wherein said at least one steering gear joint member and said at least one leg member being formed integrally as a one-piece metal casting.

11. The mounting system as defined in claim 8, wherein said at least one steering gear joint member and said at least one leg member are formed integrally with said steering gear housing member as a homogenous one-piece unitary part.

12. The mounting system as defined in claim 11, wherein said at least one steering gear joint member and said at least one leg member are formed integrally with said steering gear housing member as a homogenous one-piece metal casting.

13. A mounting system for coupling attaching mounting a steering gear housing member to a cross-member of a vehicle frame, said mounting system comprising:
    at least two single-piece steering gear brackets secured to said cross-member of said vehicle frame;
    at least two single-piece steering gear joint members integral with said steering gear housing member, each of said at least two steering gear joint members secured to one of said at least two steering gear brackets; and
    at least two spaced apart leg members each extending between said steering gear housing member and corresponding one of said at least two steering gear joint members, said at least two leg members being integral with said steering gear housing member and corresponding steering gear joint members;
    each of said at least two single-piece steering gear brackets having a horizontally extending flange and a pair of spaced apart vertically extending flanges, each of said at least two single-piece steering gear brackets secured to said cross-member of said vehicle frame by welding;
    each of said at least two single-piece steering gear joint members having an upper end portion secured to said horizontally extending flange and a pair of opposite side boss portions extending between said pair of spaced apart vertically extending flanges of one said at least two steering gear brackets and secured thereto, each of said steering gear joint members being fastened to corresponding one of said at least two steering gear brackets with threaded fasteners;
    wherein said at least two steering gear joint members and said at least two leg members are formed integrally with said steering gear housing member as a homogenous one-piece metal casting.

* * * * *